(12) United States Patent
Mink et al.

(10) Patent No.: US 6,420,298 B1
(45) Date of Patent: Jul. 16, 2002

(54) METALLOCENE CATALYST COMPOSITIONS, PROCESSES FOR MAKING POLYOLEFIN RESINS USING SUCH CATALYST COMPOSITIONS, AND PRODUCTS PRODUCED THEREBY

(75) Inventors: Robert I. Mink, Warren; Thomas E. Nowlin, Cranbury; Sandra D. Schregenberger, Neshanic; Kenneth G. Schurzky, Bridgewater; Pradeep P. Shirodkar, Belle Mead, all of NJ (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/387,186

(22) Filed: Aug. 31, 1999

(51) Int. Cl.$^7$ ................................. B01J 31/00
(52) U.S. Cl. ....................... 502/113; 502/114; 502/115; 502/116; 502/117; 502/120; 502/125; 502/152; 502/156; 526/114; 526/127; 526/160; 526/943
(58) Field of Search ................. 502/113, 114, 502/115, 116, 117, 120, 125, 152, 156; 526/114, 127, 160, 943

(56) References Cited

U.S. PATENT DOCUMENTS

| | | | |
|---|---|---|---|
| 2,924,593 A | 2/1960 | Breslow et al. ............ 260/94.9 |
| 4,701,432 A | 10/1987 | Welborn, Jr. ................ 502/113 |
| 5,049,535 A | 9/1991 | Resconi et al. ............. 502/117 |
| 5,157,008 A | 10/1992 | Sangokoya et al. ......... 502/111 |
| 5,238,892 A | 8/1993 | Chang ........................ 502/111 |
| 5,332,706 A | 7/1994 | Nowlin et al. .............. 502/107 |
| 5,395,810 A | * 3/1995 | Shamshoum et al. ....... 502/113 |
| 5,849,653 A | 12/1998 | Dall'Occo et al. .......... 502/117 |
| 6,037,296 A | * 3/2000 | Hsieh et al. ................ 502/113 |
| 6,051,525 A | * 4/2000 | Lo et al. .................... 502/113 |
| 6,136,747 A | * 10/2000 | Kao et al. .................. 502/158 |

FOREIGN PATENT DOCUMENTS

| | | |
|---|---|---|
| EP | 520816 | 12/1992 |
| EP | 974601 | 1/2000 |
| JP | 4-266851 | 9/1992 |
| JP | 06 136046 A | 5/1994 |
| JP | 06 136049 A | 5/1994 |
| WO | WO95/13871 | 5/1995 |
| WO | WO97/35891 | 10/1997 |

* cited by examiner

*Primary Examiner*—Elizabeth D. Wood
(74) *Attorney, Agent, or Firm*—Stephen D. Prodnuk

(57) ABSTRACT

A catalyst composition for the polymerization of one or more 1-olefins (e.g., ethylene) comprises a transition metal catalyst precursor and a cocatalyst, the transition metal catalyst precursor comprising a contact product of an unsubstituted metallocene compound and an aluminum alkyl compound in a hydrocarbon solvent solution. In another embodiment, the transition metal catalyst precursor is bimetallic and contains a non-metallocene transition metal catalyst component. When a bimetallic catalyst precursor is used, the resin product exhibits improved properties, and has a bimodal molecular weight distribution, long chain branching (LCB), and good bubble stability.

17 Claims, 4 Drawing Sheets

METALLOCENE CATALYST COMPOSITIONS, PROCESSES FOR MAKING POLYOLEFIN RESINS USING SUCH CATALYST COMPOSITIONS, AND PRODUCTS PRODUCED THEREBY

FIELD OF THE INVENTION

The present invention relates to novel catalyst compositions and to processes for making polyolefin resins using such novel catalyst compositions, polyolefin resins, and articles made from such polyolefin resins. In particular, this disclosure relates to processes for making bimodal polyolefin resins using a novel catalyst composition comprising a bimetallic transition metal catalyst precursor and a cocatalyst. This disclosure also relates to polyolefin resins with improved properties (e.g., improved bubble stability) having bimodal molecular weight distributions and long chain branching, as well as articles made from such polyolefin resins.

BACKGROUND OF THE INVENTION

Increasing the molecular weight of polyethylene (and copolymers of ethylene) generally results in enhancing tensile strength, ultimate elongation, impact strength, puncture resistance, and toughness of films. However, increasing the molecular weight of the polyethylene will usually decrease its processability. By providing a blend of a relatively high molecular weight (HMW) ethylene polymer with a relatively lower molecular weight (LMW) ethylene polymer, the desirable characteristics due to the relatively high molecular weight polymer component can be retained while, at the same time, improving processability of the blend material containing the relatively high molecular weight and low molecular weight polymer components.

To produce such blends, various alternatives are being considered in the art, including post reactor or melt blending, catalysis in a single reactor with a catalyst effective to produce the blend material, and use of multistage reactors in which different molecular weight components can be produced sequentially in each reactor.

U.S. Pat. No. 2,924,593 to Breslow discloses a process for producing high molecular weight polyethylene comprising contacting ethylene with a catalyst composition comprising a bis(cyclopentadienyl)zirconium salt and a metal alkyl compound of an alkali metal, an alkaline earth metal, or aluminum. In Example 7, the catalyst composition is formed in situ by contacting bis(cyclopentadienyl)zirconium dichloride, triethylaluminum, and ethylene in toluene.

U.S. Pat. No. 4,701,432 to Welborn, Jr. discloses a catalyst system comprising (i) a metallocene and a non-metallocene transition metal compound (i.e. a transition metal compound not containing cyclopentadienyl) supported catalyst component and (ii) a combination of an organometallic compound of a metal of Groups IA, IIA, IIB and IIIA of the Periodic Table and an alumoxane cocatalyst. The catalyst composition is disclosed as being useful for olefin polymerization, and particularly for the production of linear low, medium and high density polyethylenes and copolymers of ethylene with alpha-olefins having 3 or more carbon atoms ($C_3$–$C_{18}$), cyclic olefins, and/or diolefins having up to 18 carbon atoms.

U.S. Pat. No. 5,049,535 to Resconi, et al. discloses that the activity of a catalyst composition obtained from zirconocenes and trialkylaluminum compounds is extremely low when applied to the polymerization of ethylene and practically nil for higher olefins (column 1, lines 10–26). To increase activity, Resconi, et al. proposed the use of substituted metallocene compounds in combination with trialkylaluminum compounds.

U.S. Pat. No. 5,157,008 to Sangokoya, et al. discloses the production of hydrocarbon solvent solutions of alkylalumoxanes by mixing trimethylaluminum and a hydrocarbylaluminum compound, which compound contains at least one hydrocarbyl group having 2 or more carbon atoms, in a hydrocarbon solvent and thereafter adding water or a hydrated compound so as to form a solution of alkylalumoxane in said solvent.

U.S. Pat. No. 5,238,892 to Chang discloses an olefin polymerization catalyst composition comprising a solid product produced by mixing and reacting a metallocene and an aluminum alkyl, for example trialkylaluminum, in a hydrocarbon solvent to form a reaction product, and thereafter adding an undehydrated support material to the reaction mixture.

U.S. Pat. No. 5,332,706 to Nowlin, et al. discloses that the metallocene catalyst must contact the alumoxane (e.g., methylalumoxane (MAO)), while the alumoxane is in solution in order for the metallocene to be activated in a fluidized-bed reactor. Moreover, the patent discloses that extensive reactor fouling results when MAO solutions are fed directly into the gas phase reactor in large enough quantities to provide this liquid contact. The fouling was found to occur because the MAO solution forms a liquid film on the interior walls of the reactor, and the catalyst is activated when it comes into contact with this liquid film, which in turn leads to the formation of a polymer coating that grows larger in size until the reactor is fouled.

U.S. Pat. No. 5,849,653 to Dall'Occo, et al. discloses catalysts for the polymerization of olefins obtained from cyclopentadienyl compounds of a transition metal, an organometallic aluminum compound, and water.

Japanese Laid-Open Patent Application (Kokai) No. 4-266891 discloses a process for producing a methylisobutylalumoxane having high activity and excellent solubility in hydrocarbons.

It would be desirable to provide a catalyst composition that is capable of producing a bimodal molecular weight distribution (MWD) polyolefin resin with improved properties (e.g., bubble stability) having a bimodal molecular weight distribution and long chain branching. Further, it would be highly desirable to provide a catalyst composition with high activity from which bimodal polyolefin resins having long chain branching can be produced, wherein the polyolefin resins do not require special post-polymerization tailoring (i.e., the polyolefin resins do not have to be treated with modifiers, such as oxygen or organic peroxides, to modify the molecular weight distribution) and yet possess excellent bubble stability.

SUMMARY OF THE INVENTION

In one embodiment, a catalyst composition is provided, wherein the catalyst composition comprises a transition metal catalyst precursor and a cocatalyst, the transition metal catalyst precursor comprising the contact product of an unsubstituted metallocene compound and an aluminum alkyl compound in a hydrocarbon solvent solution.

In an alternative embodiment, a catalyst composition is provided, wherein the catalyst composition comprises a bimetallic transition metal catalyst precursor and a cocatalyst, the bimetallic transition metal catalyst precursor comprising:

(a) the contact product of an unsubstituted metallocene compound and an aluminum alkyl compound in a hydrocarbon solvent solution; and (b) a non-metallocene transition metal component.

Further, a process for polymerizing olefins (e.g., ethylene and/or higher olefins) is provided, wherein the process comprises contacting one or more olefins with a catalyst composition comprising a transition metal catalyst precursor and a cocatalyst, the transition metal catalyst precursor comprising the contact product of an unsubstituted metallocene compound and an aluminum alkyl compound in a hydrocarbon solvent solution.

Alternatively, another process for polymerizing olefins (e.g., ethylene and/or higher olefins) is provided, wherein the process comprises contacting one or more olefins with a catalyst composition comprising a bimetallic transition metal catalyst precursor and a cocatalyst, the bimetallic transition metal catalyst precursor comprising:

(a) the contact product of an unsubstituted metallocene compound and an aluminum alkyl compound in a hydrocarbon solvent solution; and (b) a non-metallocene transition metal component.

In yet another embodiment, a polyolefin resin having improved bubble stability is provided, wherein the polyolefin resin has a bimodal molecular weight distribution and long chain branching.

Further, an ethylene (co)polymer is provided, wherein the ethylene (co)polymer is produced in a single reactor and has a bimodal molecular weight distribution, a flow activation energy of at least about 27 kjoule/mole, a density of from about 0.89 to about 0.965 g/cc, a melt index of from about 0.01 to about 0.2 g/10 minutes, a high load melt index (HLMI) of from about 2 to about 100 g/10 minutes, and a melt flow ratio (MFR) of from about 40 to about 300.

Other additional embodiments include various articles made from the above-described polyolefin resins.

DETAILED DESCRIPTION OF THE INVENTION

Figure 1:
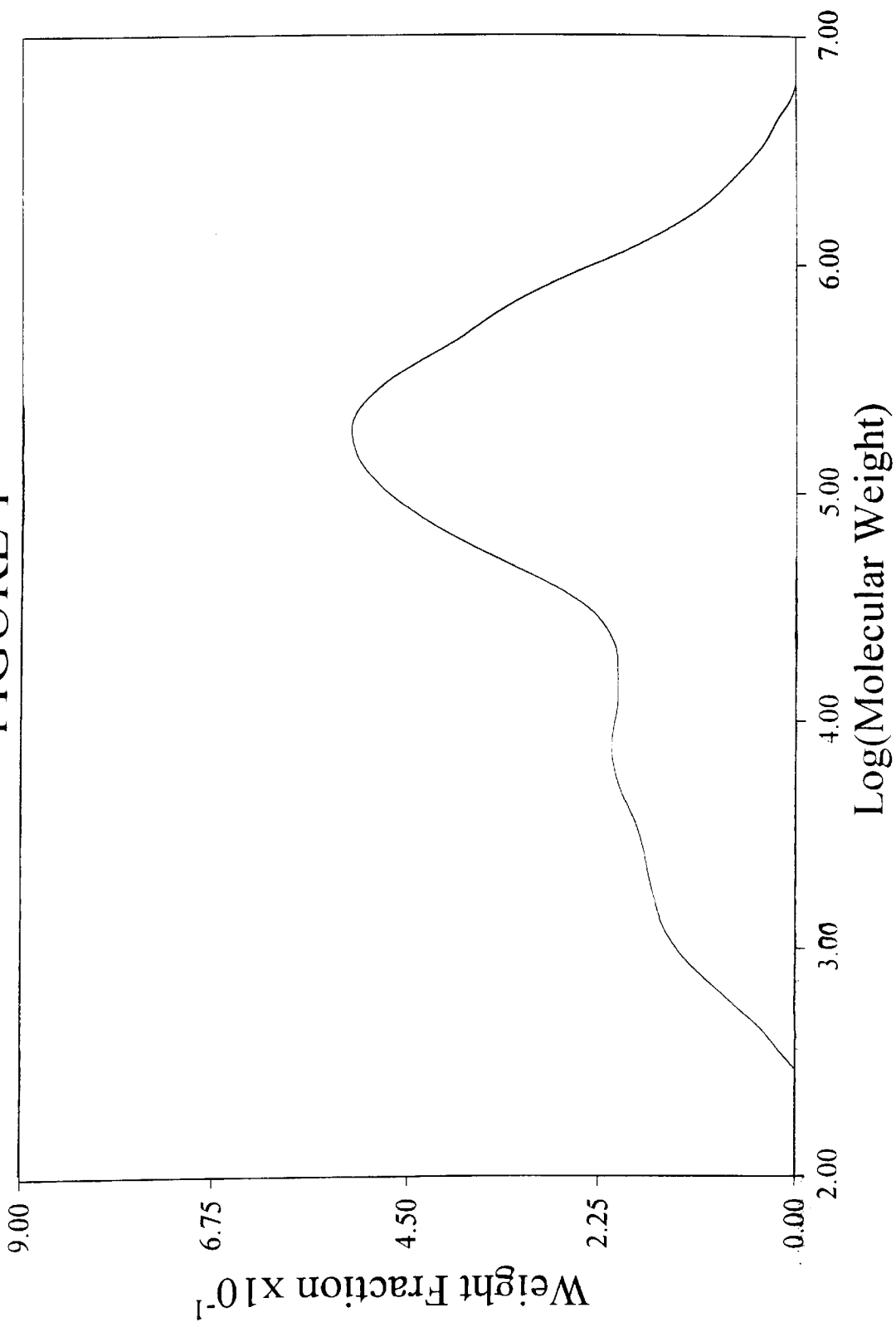
FIG. 1 shows the bimodal molecular weight distribution of the resin of Example 4, as measured by Gel Permeation Chromatography (GPC).

In one aspect, the catalyst composition comprises a transition metal catalyst precursor and a cocatalyst, the transition metal catalyst precursor comprising the contact product of an unsubstituted metallocene compound and an aluminum alkyl compound (e.g., a trialkylaluminum compound) in a hydrocarbon solvent solution.

Useful metallocene compounds include unsubstituted metallocene compounds that are organometallic coordination compounds of transition metal compounds. For example, these metallocene compounds may be complexes of a transition metal of the formula $L_xMQ_yQ'_z$. In this formula, L represents an unsubstituted ligand group (e.g., cyclopentadienyl), M is a transition metal selected from the group consisting of Group 4 metals of the Periodic Chart of the Elements, as published by *Chemical and Engineering News*, 63(5), 27, 1985, such as titanium, zirconium and hafnium, and each of Q and Q' is a halogen atom, an alkyl group, or a hydrogen atom and Q and Q' may be the same or different, wherein x is at least 1 and y and z have values such that x+y+z is equal to the valence of M. The use of a mixture of metallocene compounds is also contemplated.

In the above formula of the metallocene complex, a typical transition metal atom M is zirconium. As described above, the ligand group L may be an unsubstituted cyclopentadienyl group, where x is at least 1 and typically is 2, and x+y+z equals the valence of M. If the substituents Q and Q' in the above formula of the metallocene complex are halogen atoms, they belong to the group of fluorine, chlorine, bromine or iodine, and y+z is 3 or less. If the substituents Q and Q' in the above formula of the metallocene complex are alkyl groups, they are typically linear or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include, but are not limited to:

bis(cyclopentadienyl)metal dihalides;
bis(cyclopentadienyl)metal hydridohalides;
bis(cyclopentadienyl)metal monoalkyl monohalides; and
bis(cyclopentadienyl)metal dialkyls;
  wherein the metal is, for example, zirconium, titanium, or hafnium atom, the halide atoms are, for example, chlorine and the alkyl groups are $C_1$–$C_6$ alkyl groups. Illustrative but non-limiting examples of metallocene complexes include bis(cyclopentadienyl)zirconium dichloride;
bis(cyclopentadienyl)titanium dichloride;
bis(cyclopentadienyl)hafnium dichloride;
bis(cyclopentadienyl)zirconium dimethyl;
bis(cyclopentadienyl)hafnium dimethyl;
bis(cyclopentadienyl)zirconium hydridochloride;
bis(cyclopentadienyl)hafnium hydridochloride; and
cyclopentadienylzirconium trichloride.

As previously mentioned, the $L_xMQ_yQ'_z$ compound is contacted with an aluminum alkyl compound, for example a trialkylaluminum compound. Contact of these two components is undertaken in a suitable hydrocarbon solvent, for example a non-aromatic solvent. The volume of the solvent is sufficient to produce a solution of the contact product. The solvents which can be used for this purpose include paraffins of 4 to 10 carbon atoms, linear or branched, and are exemplified by n-hexane, isohexane, n-heptane, etc., and their mixtures, as well as cycloalkanes such as methylcyclopentane, cyclohexane, methylcyclohexane, etc. When trimethylaluminum is used, the solvent may be an aromatic solvent such as toluene. Other suitable aromatic solvents include benzene, xylene or ethylbenzene.

The aluminum alkyl compounds, typically trialkylaluminum compounds, which are contacted with the $L_xMQ_yQ'_z$ compounds are characterized by the formula $AlR_3$, wherein each R may be the same or different and is independently an alkyl group, linear or branched, containing 1 to 12 carbon atoms. For example, the alkyl groups can be methyl, ethyl, propyl, isopropyl, butyl, isobutyl, pentyl, isopentyl, hexyl, isohexyl, heptyl, isoheptyl, octyl, or isooctyl. Representative trialkylaluminum compounds include, but are not limited to, trimethylaluminum (TMA), triethylaluminum (TEAL), triisobutylaluminum (TIBA), and tri-n-octylaluminum (TOA).

The molar ratio of the aluminum alkyl compound to the $L_xMQ_yQ'_z$ complex can range from about 2 to about 50, typically from about 3 to about 40, and most typically from about 4 to about 30.

The concentration of the metallocene compound in the hydrocarbon solvent may range from about 0.1 wt % to about 20 wt %, typically from about 0.5 wt % to about 15 wt %.

When the transition metal catalyst precursors of the invention contain two or more $L_xMQ_yQ'_z$ compounds, they may be contacted individually or separately with the aluminum alkyl compound.

The contact product of the transition metal catalyst precursor is formed by contacting the metallocene and the aluminum alkyl compound in a suitable hydrocarbon solvent at a temperature of from about 0° C. to about 100° C., typically from about 15° C. to about 60° C., for about 1.0 to about 1500 minutes, typically for about 10 to about 180 minutes.

For example, the contact product of the transition metal catalyst precursor may be formed by adding a solution of the trialkylaluminum compound to the metallocene compound to form a solution of the contact product. Alternatively, the process for making the contact product of the transition metal catalyst precursor includes contacting the neat trialkylaluminum compound with the metallocene compound to form a solution of the contact product.

In one alternative embodiment, a bimetallic transition metal precursor is formed. The bimetallic transition metal catalyst precursor comprises (a) the contact product of an unsubstituted metallocene compound and an aluminum alkyl compound in a hydrocarbon solvent solution, as described above, and (b) a non-metallocene transition metal component.

In this embodiment, a wide variety of non-metallocene transition metal components may be used.

While not limited thereto, the non-metallocene transition metal component (b) may be made by reacting an organomagnesium containing compound, an alcohol, a non-metallocene transition metal compound, and, optionally, a carrier or support.

The support, if used, may be inorganic or organic. In general, the support for the non-metallocene transition metal catalyst component may be any carrier material which contains hydroxyl groups. A specific support material for the catalyst precursor is a particulate, porous, typically inorganic material, such as an oxide of silicon and/or of aluminum. The support material is used in the form of a dry powder having an average particle size of from about 1 micron to about 500 microns. The surface area of the support should be at least about 3 square meters per gram ($m^2/g$), and typically from at least 50 $m^2/g$ up to 400 $m^2/g$. The support material should be dry, that is, free of absorbed water. Drying of the support material can be effected by heating it at about 100° C. to about 1000° C., typically at about 600° C. When the support is silica, it is heated to at least about 200° C., typically about 400° C. to about 900° C., and more typically about 600° C. to about 850° C. The support material should have at least some active hydroxyl (OH) groups on its surface to produce the catalyst compositions of this invention. The number of OH groups on the support surface (silanol groups in the case of silica) is approximately inversely proportional to the temperature of drying or dehydration (i.e., the higher the temperature the lower the hydroxyl group content).

In one specific embodiment, the support is silica which, prior to the use thereof in the catalyst precursor synthesis, has been dehydrated by fluidizing it with nitrogen flow and heating at about 600° C. for about 4–16 hours to achieve a surface OH group concentration of about 0.7 millimoles per gram (mmol/g). The silica is typically a high surface area, amorphous silica (surface area=300 $m^2/g$; pore volume of 1.65 $cm^3/g$), and it is a material marketed under the tradenames of Davison 952 or Davison 955 by the Davison Chemical Division of W. R. Grace and Company or Crosfield ES70 by Crosfield Limited. The silica is in the form of spherical particles, which are obtained by a spray-drying process. As procured, these silicas are not calcined and thus must be dehydrated as indicated above.

The synthesis of the non-metallocene catalyst component (b) may conveniently be carried out in a series of several consecutive steps under inert conditions in the absence of water and of oxygen.

Support material containing OH groups on their surface is slurried in a non-polar non-aromatic solvent. The slurry of the support material in the solvent is prepared by introducing the support into the solvent, typically while stirring, and heating the mixture to about 25 to about 70° C., typically to about 40 to about 60° C. Suitable non-polar solvents are materials which are liquid at reaction temperatures and in which all of the reactants used later during the catalyst precursor preparation, i.e., organomagnesium compounds and the non-metallocene transition metal compounds, are at least partially soluble. Typical non-polar solvents are alkanes, such as isopentane, hexane, isohexane, n-heptane, isoheptane, octane, nonane, and decane, although a variety of other materials including cycloalkanes, such as cyclohexane and methylcyclohexane can also be used. During the first stage of the catalyst synthesis, the manufacture of the intermediate catalyst precursor, aromatic solvents, such as benzene, toluene and ethylbenzene, may also be employed. The most typical non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity. The temperature of the slurry is important with respect to its impregnation with a non-metallocene transition metal compound; that is, temperatures of the slurry in excess of 90° C. for extended periods may result in deactivation of the transition metal component added subsequently. Accordingly, all catalyst precursor synthesis steps are conducted below 90° C.

In the second step, the slurry of the support is contacted with an organomagnesium compound normally provided as a solution. This solution may contain small quantities of a solubilizing compound such as a trialkylaluminum. For example, in the case of butylethylmagnesium (BEM), triethylaluminum may be complexed with the BEM to solubilize the organomagnesium compound. An example of such a complex is MAGALA, which is available from Akzo Nobel.

The organomagnesium compound has the empirical formula

where R and R' are the same or different $C_2$–$C_{12}$ alkyl groups, typically $C_4$–$C_{10}$ alkyl groups, more typically $C_4$–$C_8$ alkyl groups, and most typically both R and R' are butyl groups, and m and n are each 0, 1 or 2, providing that m+n is equal to the valence of Mg.

In a specific embodiment of the synthesis of this non-metallocene catalyst component (b), it is important to add only such an amount of the organomagnesium compound that will be deposited, physically or chemically, into the support since any excess of the organomagnesium compound in the liquid phase may react with other chemicals used for the catalyst synthesis and precipitate them outside of the support. The drying temperature of the support material affects the number of sites on the support available for the organomagnesium compound: the higher the drying temperature the lower the number of sites. Thus, the exact molar ratio of the organomagnesium compound to the OH groups in the support will vary and must be determined on a case-by-case basis to assure that only so much of the organomagnesium compound is added to the solution as will be deposited into the support without leaving any excess of the organomagnesium compound in the liquid phase. Thus, the molar ratios given below are intended only as an approximate guideline and the exact amount of the organomagnesium compound in this embodiment must be controlled by the functional limitation discussed above, i.e., it must not be greater than that which can be deposited into the support. If a greater amount of the organomagnesium compound is added to the slurry, the excess may react with the non-metallocene transition metal compound added to the slurry later, thereby forming a precipitate outside of the support which is detrimental in the synthesis of the catalyst and must be avoided. The required amount of the organomagnesium compound can be determined in any conventional manner, e.g., by adding the organomagnesium compound to the slurry of the support until a free organomagnesium compound is detected in the liquid phase.

For example, for the silica support, the amount of the organomagnesium compound added to the slurry may be such that the molar ratio of Mg to the OH groups on the support is about 0.5:1 to about 4:1, typically about 0.8:1 to about 3:1, more typically about 0.9:1 to about 2:1 and most typically about 1:1.

Next, the support treated with the organomagnesium compound is contacted with an alcohol (R"OH) containing R"O— groups which are capable of displacing alkyl groups on the magnesium atom. The amount of the alcohol is effective to provide a [R"OH]:Mg molar ratio of from about 0.5 to about 2.0, typically from about 0.8 to about 1.5. The reaction is carried out at a temperature ranging from about 25° C. to about 80° C., typically from about 40° C. to about 70° C.

The alkyl group R" in the alcohol can contain about 1 to about 12 carbon atoms, typically about 1 to about 8 carbon atoms; in the embodiments below, they are alkyl groups containing about 2 to about 4 carbon atoms, particularly 4 carbon atoms. The inclusion of the alcohol step in the catalyst precursor synthesis produces a catalyst composition which, relative to the catalyst precursor prepared without this step, is much more active, requires much less transition metal (e.g., titanium), and does not interfere with the performance of the metallocene component in the catalyst.

Next, the slurry is contacted with a non-metallocene transition metal compound. During this step, the slurry temperature must be maintained at about 25 to about 70° C., typically at about 40 to about 60° C. As noted above, temperatures in this slurry of about 90° C. or greater result in deactivation of the non-metallocene transition metal component. Suitable transition metal compounds used herein are compounds of metals of Groups 4 and 5, of the Periodic Chart of the Elements, as published by *Chemical and Engineering News*, 63(5), 27, 1985, provided that such compounds are soluble in non-polar solvents. Non-limiting examples of such compounds are titanium and vanadium halides, e.g., titanium tetrachloride, vanadium tetrachloride, vanadium oxytrichloride, titanium and vanadium alkoxides, wherein the alkoxide moiety has a branched or unbranched alkyl radical of about 1 to about 20 carbon atoms, typically 1 to about 6 carbon atoms. For example, the transition metal compounds are titanium compounds, typically tetravalent titanium compounds. The most typical titanium compound is $TiCl_4$. The amount of titanium (or vanadium) ranges from a Ti/Mg molar ratio of about 0.3 to about 1.5, typically from about 0.50 to about 0.80. Mixtures of such transition metal compounds may also be used and generally, no restrictions are imposed on the non-metallocene transition metal compounds that may be included. Any non-metallocene transition metal compound that may be used alone may also be used in conjunction with other transition metal compounds.

After the addition of the non-metallocene transition metal compound is complete, in one embodiment of catalyst synthesis, the slurry solvent is removed by evaporation or filtering to obtain a free-flowing powder.

Next, the non-metallocene transition metal component (b) and the contact product (a) are combined to form the bimetallic transition metal catalyst precursor. For example, the dried non-metallocene transition metal catalyst component (b) is reslurried in a non-polar hydrocarbon (the same as the solvent used for the preparation of the initial support slurry) and is contacted with a solution containing the contact product (a). The contact of (a) and (b) is carried out at temperatures ranging from about 10° C. to about 60° C. and lasts from about 10 to about 1,000 minutes.

Optionally, (i) the contact product of the metallocene compound and the aluminum alkyl compound or (ii) the reaction product of the contact product (a) and the non-metallocene transition metal component (b) may be further contacted with a solution of an alumoxane (e.g., MAO or MMAO, which is a modified methylalumoxane from Akzo Nobel). The alumoxane is typically provided in an aromatic or aliphatic solvent such as toluene or heptane. The use of an alumoxane, in particular MAO, has been found to provide an improvement in terms of the homogeneity of the polymer particle morphology. When MAO is used, the molar ratio of the MAO to the $L_xMQ_yQ'_z$ complex (i.e., Al/M molar ratio) may be up to about 200.

The transition metal catalyst precursor or the bimetallic transition metal catalyst precursor may be used in the form of a free-flowing particulate form. This is obtained by evaporating the solvent(s) used during the catalyst precursor synthesis.

The catalyst composition also comprises an activating cocatalyst component in addition to the transition metal component. The cocatalyst may comprise an alumoxane (e.g., MMAO obtained from Akzo Nobel), optionally an aluminum alkyl (which may be the same or different as the aluminum alkyl used for the catalyst precursor synthesis), and optionally water.

In general, the resins as described herein are made in one reactor, under suitable reactor conditions. In particular, the bimodal resins are typically made by polymerizing one or more olefins (e.g., ethylene) in the presence of the bimetallic catalyst composition comprising two sources of transition metal each of which produce different molecular weight polymer.

For purposes of this disclosure, the term "(co)polymer" or "polymer" is inclusive of homopolymers, copolymers made from two different monomers, or interpolymers of more than two types of monomers (e.g., terpolymers). That is, the term copolymer should be construed to include not only polymers made from only two different types of monomers, but also polymers made from three or more different types of monomers (e.g., a terpolymer). In addition, the term "(co) polymer" or "polymer" includes random polymers, block polymers, graft polymers, etc.

In the polymerization processes described herein, the polymerization may be conducted in gas phase (e.g., fluidized-bed) or liquid phase (e.g., slurry).

In gas phase polymerization, the gaseous monomer feed may, for example, consist wholly of ethylene or may comprise a preponderance of ethylene and a minor amount of one or more comonomers such as a 1-olefin containing from about 3 to about 10 carbon atoms. In particular, the amount of comonomer(s) may be in the range of, for example, from about 0 to about 30 weight percent, typically from about 0 to about 20 weight percent, based on the total weight of polymer produced in the process.

In particular, the resins according to this disclosure include 1) a homopolymer of ethylene; or 2) a copolymer of a preponderance (i.e., greater than 50 wt. %) of ethylene with a minor amount of one or more 1-olefins containing from about 3 to about 10 carbon atoms, typically 1-olefin(s) containing from about 4 to about 10 carbon atoms, e.g., 1-butene, 1-pentene, 1-hexene, 4-methyl-1-pentene, 1-octene, 1-decene, and mixtures thereof; or 3) a mixture of any of the foregoing polymers.

For example, the polymer product can comprise an amount of polymerized comonomer which is in the range, for example, of about 0 to 30 weight percent, based on the total weight of polymer.

In the case of ethylene polymerization, hydrogen is typically fed to the reactor such that the molar ratio of hydrogen to ethylene ($H_2/C_2$ ratio) is, for example, up to about 0.15, typically from about 0.005 to about 0.03.

The ethylene partial pressure employed in the reactor is usually no higher than about 1,724 kPa (250 psia), for example in the range of about 345 kPa (50 psia) to about 1,379 kPa (200 psia), typically in the range of about 690 kPa (100 psia) to about 1,310 kPa (190 psia).

If desired for any purpose, e.g., to control superficial gas velocity or to absorb heat of reaction, an inert gas such as nitrogen may also be present in the reactor in addition to the monomer and hydrogen. Thus the total pressure in the reactor may be in the range, for example, of about 791 kPa (114.7 psia) to about 4,238 kPa (614.7 psia), typically about 1,480 kPa (214.7 psia) to about 2,859 kPa (414.7 psia).

The temperature of polymerization in the reactor may be in the range, for example, of about 60 to about 130° C., typically about 70 to about 110° C. The residence time of the catalyst in the reactor is about 1 to about 8 hours, typically about 1.5 to about 4 hours in the reactor.

The resins produced by using the catalyst compositions containing the bimetallic transition metal catalyst precursor and the cocatalyst described above are bimodal and also contain long-chain branching (LCB). By "bimodal," it is meant that there are two polymer components of different molecular weights, that is one has a higher relative molecular weight than the other of the two components. The presence of LCBs is also beneficial for the bubble stability of the resin during the film blowing process. The bimodal polyolefin resins described herein do not require special post-polymerization tailoring (i.e., the polyolefin resins do not have to be treated with modifiers, such as oxygen or organic peroxides, to modify the molecular weight distribution) and yet they possess excellent bubble stability.

An improvement in bubble stability of the resin during film production over other bimodal molecular weight resins has been attributed to the new resins herein. The resins, which are processed on high stalk extrusion lines, exhibit excellent bubble stability, a prerequisite to being processed on those lines at high rates. This improvement in bubble stability has been correlated to the presence of LCB as measured by the flow activation energy of the invention resins. It is believed that this property is directly a result of the catalyst composition used to make them.

The resins exhibit a characteristic flow activation energy. It is believed that the high flow activation energy of the products is indicative of the presence of LCBs, which are known to improve the bubble stability of blown film resins by increasing their melt tension. Bubble stability is quantified as the maximum line speed that can be sustained without increasing bubble oscillations on a given blown film line. The higher the line speed that the blown film is being fabricated, the thinner the gauge of the film. Improved bubble stability is beneficial to a film converter because it allows the production of a thinner film and/or the achievement of higher rates with reduced risk of a downed extrusion line.

The flow activation energy (FAE) of the resins of the present invention is higher than about 27 kjoule/mole. The FAE measures the temperature dependencies of dynamic viscosity, and these measurements are performed at different temperatures using the RMS 800, over different ranges of temperature, frequency, and strain. Rheometrics® Orchestrator 6.4.3 software can be used for the calculation of FAE. The dynamic properties used herein are described in ASTM D 4440-84.

In addition, the density, the melt index (MI), high load melt index (HLMI), and melt flow ratio (MFR) of the resins described herein may range as follows:

Density: about 0.89 to about 0.965 g/cc

MI: about 0.01 to about 0.5 g/10 minutes

HLMI: about 2 to about 20 g/10 minutes

MFR: about 40 to about 200

The properties of the resins are determined by the following test methods:

| | |
|---|---|
| Density | ASTM D-1928 |
| | A plaque is made under controlled cooling conditions. |
| | ASTM D-1505 |
| | Measurement for density is then made in a density gradient column; reported as g/cc. |
| Melt Index (MI) | ASTM D-1238 (190° C./2160 g) |
| | Measured at 190° C. reported as grams per 10 minutes. |
| High Load Melt Index (HLMI) | ASTM D-1238 (190° C./21600 g) |
| | Measured at 10 times the weight used in the melt index test above. |
| Melt Flow Ratio (MFR) | MFR = HLMI/MI |

Compositions containing the resins described herein can be extruded into pipes, injection or blow molded into articles, or extruded and blown into films. Typically, films can be produced which are from about 5.08 to about 254 microns (about 0.2 to about 10.0 mils), typically from about 10.16 to about 50.8 microns (about 0.4 to about 2.0 mils), thickness. Blow molded articles include bottles, containers, fuel tanks and drums.

For film production, the products may contain any of various additives conventionally added to polymer compositions such as processing aids, lubricants, antiblock, stabilizers, antioxidants, compatibilizers, pigments, etc. These reagents can be employed to stabilize the products against oxidation and/or improve processability, appearance, or properties. For example, additive packages comprising 400–2000 ppm hindered phenol(s); 200–2000 ppm phosphates; and 250–2000 ppm stearates, for addition to the resin powders, can be used for pelletization. The polymers can be added directly to a blown film extruder, e.g., an Alpine extruder, to produce films having a thickness, for example of about 5.08 to about 127 microns (about 0.2 to about 5 mils).

The ethylene polymer product of this invention is capable of being formed into thin gauge films, e.g., of up to 254 microns (10 mils), of superior mechanical properties, e.g., an Elmendorf tear resistance in the machine direction (MD Tear, ASTM D1922) of at least about 236,620 g/m (about 6 g/mil), typically about 314,961 to about 2,362,205 g/m (about 8 to about 60 g/mil), and more typically about 393,701 to about 2,362,205 g/m (about 10 to about 60 g/mil), and a Dart Drop Impact resistance (F50, ASTM D1709) of at least about 50 g, typically about 100 to about 600 g, and more typically about 150 to about 600 g.

EXAMPLES

The following examples illustrate the effectiveness of the present invention without limiting the scope thereof.

Example 1

Titanium Component:

541 grams of Davison grade 955 silica, calcined at 600° C. for 4 hours under nitrogen flow was placed into a two-gallon stainless steel autoclave containing a stirring paddle. Next, ca. 2.7 liters of dry isopentane was added to the autoclave and the stirring rate set at 100 rpm. The temperature of the silica/isopentane slurry was 50–55° C. Next, 546 mls of dibutylmagnesium in heptane (0.713 mmol/ml, 389.3 mmol) was added to the slurry. The contents of the autoclave were stirred for approximately 1 hour at 50–55° C. Then, 27.43 g (370.1 mmol) of neat 1-butanol was added and stirring was continued for approximately 1 hour at 50–55° C. Finally, 44.34 g (233.7 mmol) of titanium tetrachloride was added to the autoclave and stirring was continued for approximately 1 hour at 50–55° C. The liquid phase was then removed by evaporation under a nitrogen purge to yield a free-flowing powder.

Example 2

Titanium/Zirconium Catalyst Precursor:

A triisobutylaluminum (TIBA)/bis-(cyclopentadienyl) zirconium dichloride ($Cp_2ZrCl_2$) contact product was prepared by adding a solution of TIBA in hexane (1.0 Molar, 378.82 g solution, 545 mmol of Al) to 11.153 g (38.15 mmol) of $Cp_2ZrCl_2$, which produced a yellow solution. This solution was then added into a two-gallon stainless steel autoclave which contained a slurry of 545 g of the Ti component of Example 1 in ca. 2.7 liter of isopentane heated to 50–55° C. After the addition, the mixture was stirred for approximately 1 hour at 50–55° C. Then, MAO in toluene (330.77 g solution, 1655 mmol Al) was added slowly (in a period of approximately 1 hour) to the mixture at 50–55° C. After the addition, the mixture was stirred for approximately 1 hour at 50–55° C. and then, the liquid phase was removed under nitrogen flow to yield a free-flowing powder. Analyses: 0.98 wt % Mg; 1.28 wt % Ti; 7.9 wt % Al; 0.47 wt % Zr.

Example 3

Titanium/Zirconium Catalyst Precursor:

The same procedure as described in Example 2 was used, except MMAO in heptane was used instead of MAO in toluene. Thus, 422 g of the Ti component of Example 1, 299.42 g solution (431 mmol of Al) of TIBA in hexane, 8.63 g (29.52 mmol) of $Cp_2ZrCl_2$, and 511.3 g solution (1266 mmol Al) of MMAO in heptane were employed.

Polymerization Examples

The Ti/Zr catalyst precursors (Examples 2 and 3) were activated with a cocatalyst mixture of MMAO, TMA, and $H_2O$. The resins were produced in a fluidized-bed reactor under the process conditions in the Tables below.

The resins produced from these catalysts were stabilized with the following additive package (2000 ppm Irganox 1010, 2000 ppm Irgafos 168, 2000 ppm zinc stearate) and compounded on a 1.905 cm (¾ inch) Brabender extruder under mild conditions (nitrogen purge and 220° C). The activation energy of the resultant pellets was measured on the RMS 800 rheometer as discussed earlier. The activation energy of 38 kjoule/mole indicated the presence of long chain branching.

Example 4

In this example, ethylene and hexene-1 were copolymerized using the activated bimetallic transition metal catalyst precursor of Example 2 under the conditions set out in the Table 1 below. The resin properties are also indicated in Table 1. The bimodal molecular weight distribution of the resin as measured by Gel Permeation Chromatography (GPC) is shown in FIG. 1.

TABLE 1

|  | Example 2 |
|---|---|
| CATALYST PRECURSOR | |
| TIBA, mmol/g Ti component of Example 1 | 1.0 |
| Zirconium, mmol/g Ti component of Example 1 | 0.07 |
| MAO, mmol/g Ti component of Example 1 | 3.0 |
| PROCESS | |
| Ethylene Partial Pressure, kPa (psia) | 1158 (167.9) |
| Isopentane Partial Pressure, kPa (psi) | 93.1 (13.5) |
| 1-Hexene/Ethylene Molar Ratio, mol/mol | 0.007 |
| Hydrogen/Ethylene Molar Ratio mol/mol | 0.020 |
| Bed Temp., ° C. | 90.0 |
| MMAO, ppm | 75 |
| TMA, ppm | 181 |
| $H_2O/C_2H_4$ ppmv | 11.4 |
| RESIN CHARACTERISTICS | |
| HLMI, g/10 min | 5.5 |
| MFR | 92 |
| Activation Energy, kjoule/mole | 38 |

Example 5

Figure 2:
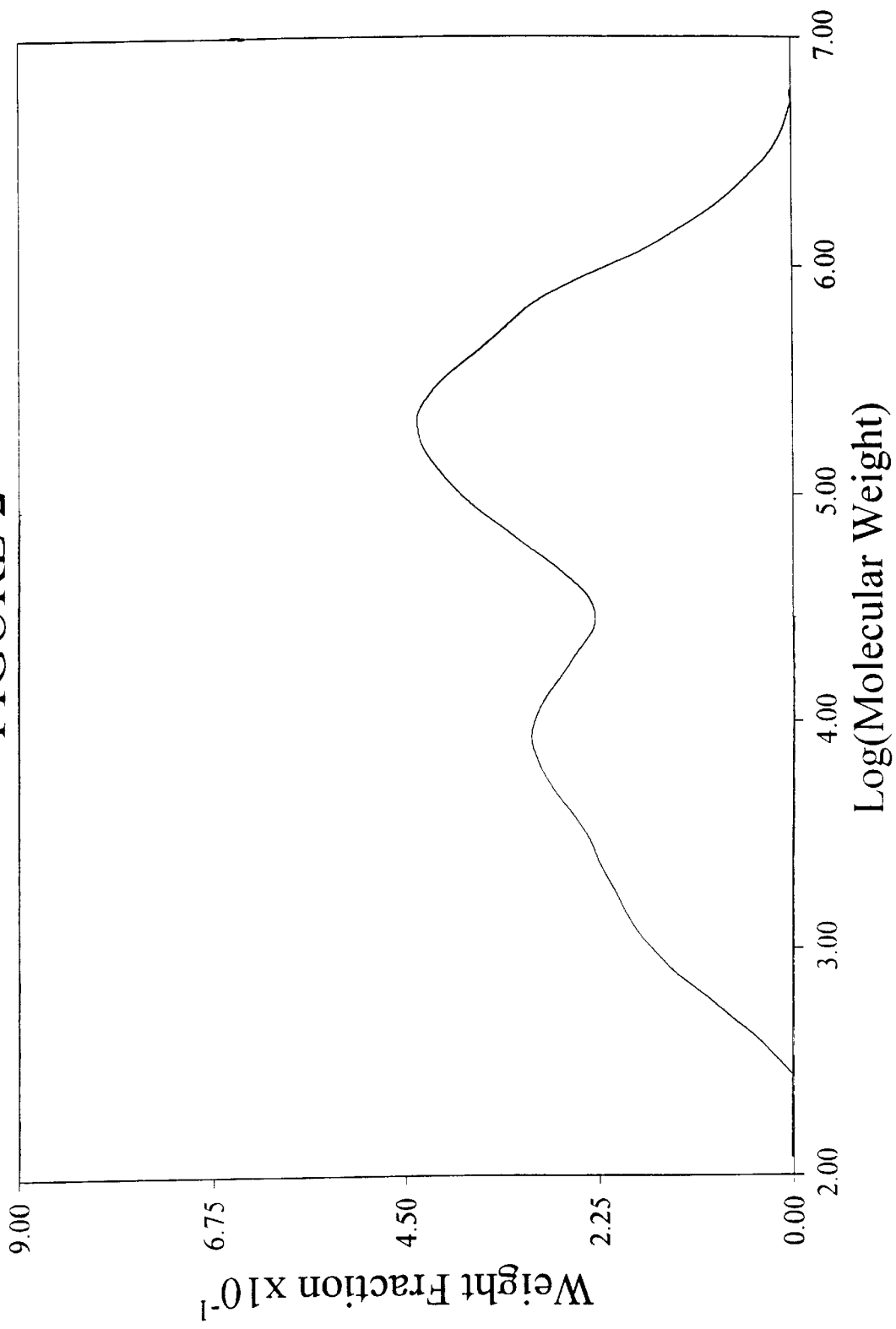
FIG. 2 shows the bimodal molecular weight distribution of the resin of Example 5, as measured by GPC.

Another resin sample was prepared in the fluidized-bed reactor with the activated catalyst precursor described in Example 2 under the conditions set out in Table 2. This resin was stabilized with antioxidants (800 ppm Irganox 1010 and 200 ppm Irgafos 168) and compounded on a Banbury mixer under mild conditions. The resin was then blown into film on a 50 mm Alpine extruder equipped with a 100 mm die and 1 mm die gap at 54.4 kg/hr (120 lb/hr), 4:1 blow up ratio (BUR) and 71.1 cm (28 inch) stalk height. The process and fabrication conditions are described in the table below. The bimodal molecular weight distribution of the resin as measured by Gel Permeation Chromatography (GPC) is shown in FIG. 2, and the resin properties are indicated in Table 2.

TABLE 2

|  | Example 2 |
|---|---|
| CATALYST PRECURSOR | |
| TIBA, mmol/g Ti Component of Example 1 | 1.0 |
| Zirconium, mmol/g Ti Component of Example 1 | 0.07 |

TABLE 2-continued

| | Example 2 |
|---|---|
| MAO, mmol/g Ti Component of Example 1 | 3.0 |
| PROCESS | |
| Ethylene Partial Pressure, kPa (psi) | 1300 (188.5) |
| Isopentane Partial Pressure, kPa (psi) | 122 (17.7) |
| 1-Hexene/Ethylene Molar Ratio, mol/mol | 0.009 |
| Hydrogen/Ethylene Molar Ratio, mol/mol | 0.021 |
| Bed Temp., °C. | 87.9 |
| MMAO, ppm | 85 |
| TMA, ppm | 143 |
| $H_2O/C_2H_4$, ppmv | 11.4 |
| RESIN CHARACTERISTICS | |
| HLMI, g/10 min | 7.3 |
| MFR | 142 |
| Density, g/cc | 0.9532 |
| BLOWN FILM EVALUATION | |
| Melt Pressure, kPa (psi) | 38,783 (5625) |
| Melt Temperature, °C. (°F.) | 213 (416) |
| Bubble Stability (max linespeed, m/min (ft/min)) | >91.4 (300) |
| Gauge, microns (mils) | 12.7 (0.5) |
| Dart Drop, F50 g | 269 |
| MD Tear, g/m (g/mil) | 629,921 (16) |
| TD Tear, g/m (g/mil) | 2,795,276 (71) |

The film was blown at very high line speeds (up to the maximum line speed of 91.4 m/min (300 feet/min)) without encountering uncontrollable bubble oscillations. This indicated that the resin has excellent bubble stability. The film properties of the resin were also good.

Examples 6 and 7

Figure 3:
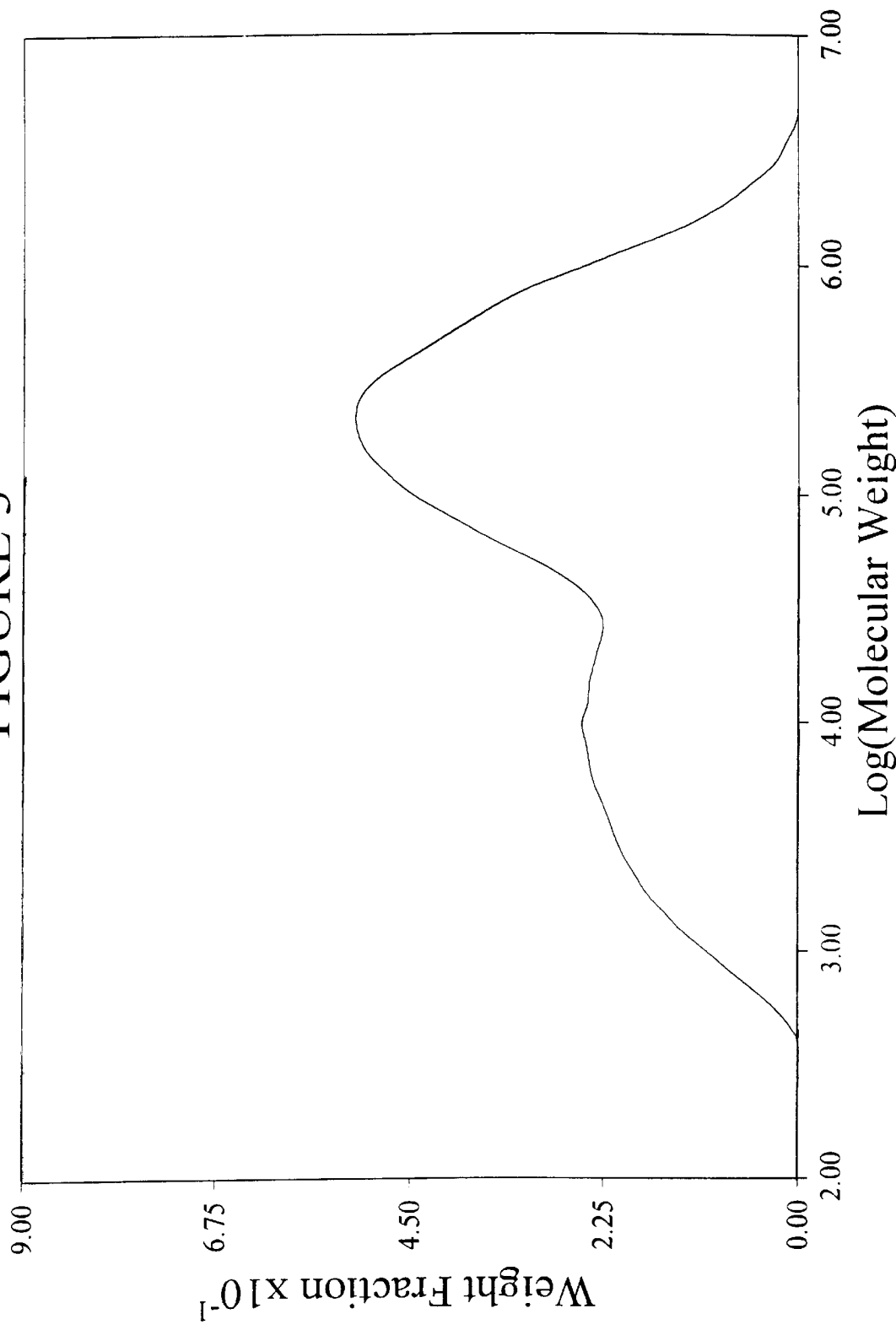
FIG. 3 shows the bimodal molecular weight distribution of the resin of Example 6, as measured by GPC.
Figure 4:
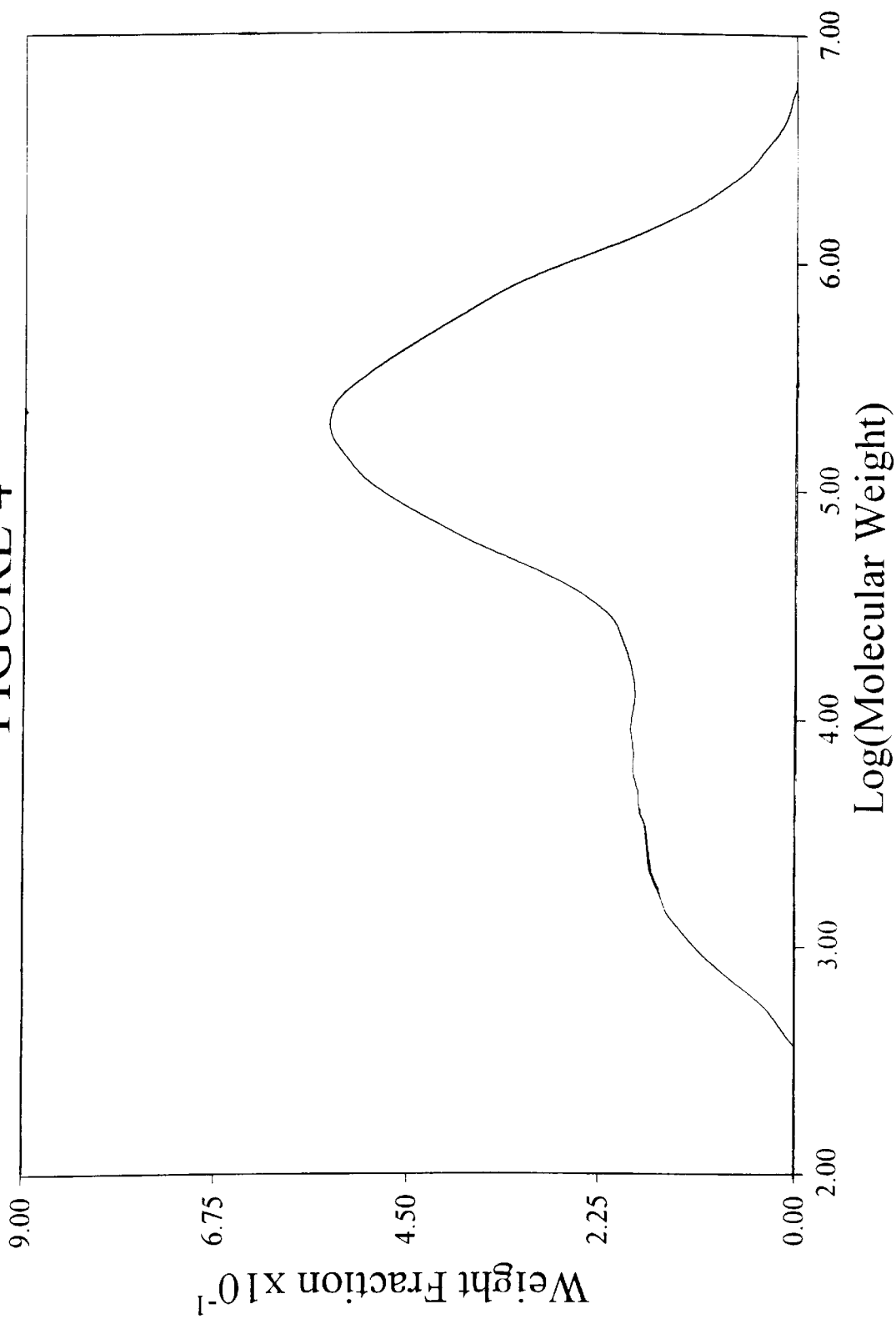
FIG. 4 shows the bimodal molecular weight distribution of the resin of Example 7, as measured by GPC.

Additional samples were prepared in the fluidized-bed reactor using the activated catalyst precursor of Examples 2 and 3 under the conditions set out in Table 3 below. The resin was stabilized with antioxidants (2000 ppm Irganox 1010, 2000 ppm Irgafos 168) and compounded on the Banbury mixer under mild conditions. The process and blown film fabrication conditions are also described below in Table 3. The bimodal molecular weight distributions of the resins of Examples 6 and 7, as measured by Gel Permeation Chromatography (GPC), are shown in FIGS. 3 and 4, respectively.

TABLE 3

| | Example 6 Example 2 | Example 7 Example 3 |
|---|---|---|
| CATALYST PRECURSOR | | |
| TIBA, mmol/g Ti Component of Example 1 | 1.0 | 1.0 |
| Zirconium, mmol/g Ti Component of Example 1 | 0.07 | 0.07 |
| MMAO or MAO, mmol/g Ti Component of Example 1 | 3.0 | 3.0 |
| PROCESS | | |
| Ethylene Partial Pressure, kPa (psi) | 1120 (162.5) | 1045 (151.5) |
| Isopentane Partial Pressure, kPa (psi) | 88.3 (12.8) | 88.9 (12.9) |
| 1-Hexene/Ethylene Molar Ratio, mol/mol | 0.009 | 0.008 |
| Hydrogen/Ethylene Molar Ratio, mol/mol | 0.015 | 0.016 |
| Bed Temp., °C. | 94.9 | 95.0 |
| MMAO, ppm | 77 | 173 |
| TMA, ppm | 161 | 165 |
| $H_2O/C_2H_4$ ppmv | 11.4 | 11.4 |
| RESIN CHARACTERISTICS | | |
| HLMI, g/10 min | 4.6 | 6.0 |
| MFR | 73 | 70 |
| Density, g/cc | 0.952 | 0.953 |
| Blown Film Evaluation | | |
| Melt Pressure, kPa (psi) | 43,781 (6350) | 39,990 (5800) |
| Melt Temperature, °C. (°F.) | 212 (414) | 214 (417) |
| Bubble Stability (max line-speed, m/min (ft/min)) | >91.4 (300) | >91.4 (300) |
| Gauge, microns (mil) | 12.7 (0.5) | 12.7 (0.5) |
| Dart Drop, F50 g | 481 | 457 |
| MD Tear, g/m (g/mil) | 629,921 (16) | 669,291 (17) |
| TD Tear, g/m (g/mil) | 2,362,205 (60) | 2,992,126 (76) |

The resins had excellent bubble stability as indicated by the maximum line speed being greater than the 91.4 m/min (300 ft/min) machine limit. In addition, the films had excellent film properties as indicated by dart impacts greater than 400 gms and MD tear values greater than 393,701 g/m (10 g/mil) for a 12.7 microns (0.5 mil) gauge film.

What is claimed is:

1. A catalyst composition comprising a bimetallic transition metal catalyst precursor and a cocatalyst, wherein the bimetallic transition metal catalyst precursor comprises the contact product of:
   (a) a non-metallocene transitional metal component on a support, and
   (b) the contact product of an unsubstituted metallocene compound and a trialkylaluminum compound in a solution of at least one of a hydrocarbon solvent and said trialkylaluminum compound,
   wherein component (b) is effectively supported on component (a), and wherein the cocatalyst comprises an alumoxane.

2. The catalyst composition of claim 1, wherein said unsubstituted metallocene compound comprises a complex of a transition metal of the formula $L_xMQ_yQ'_z$, in which L represents an unsubstituted ligand group, M is a transition metal selected from Group 4 metals, and each of Q and Q' is a halogen atom, an alkyl group, or a hydrogen atom and Q and Q' may be the same or different, wherein x is at least 1 and y and z have values such that x+y+z is equal to the valence of M.

3. The catalyst composition of claim 2, wherein M is zirconium and said ligand group L is an unsubstituted cyclopentadienyl group.

4. The catalyst composition of claim 2, wherein x is 2.

5. The catalyst composition of claim 3, wherein Q and Q' each are chlorine.

6. The catalyst composition of claim 2, wherein Q and Q' are selected from linear or branched $C_1$–$C_8$ alkyl groups.

7. The catalyst composition of claim 1, wherein said unsubstituted metallocene compound comprises bis(cyclopentadienyl) zirconium dichloride.

8. The catalyst composition of claim 2, wherein said trialkylaluminum compound is of the general formula $AlR_3$, wherein each R is independently selected from linear or branched alkyl groups containing 1 to 12 carbon atoms.

9. The catalyst composition of claim 3, wherein said trialkylaluminum compound is selected from trimethylaluminum, triethylaluminum, triisobutylaluminum and tri-n-octylaluminum.

10. The catalyst composition of claim 1, wherein said non-metallocene transition metal component on a support (a) comprises the reaction product of a support, an organomagnesium compound, an alcohol, and a non-metallocene transition metal compound.

11. The catalyst composition of claim 3, wherein said non-metallocene transition metal component comprises titanium.

12. The catalyst composition of claim 1, wherein said cocatalyst further comprises at least one of a trialkylaluminum compound and water.

13. A catalyst composition comprising a bimetallic transition metal catalyst precursor and a cocatalyst, wherein the bimetallic transition metal catalyst precursor comprises the contact product of:

(a) a non-metallocene transition metal component comprising the reaction product of a support containing hydroxyl groups, an organomagnesium compound, an alcohol, and a non-metallocene titanium compound, and (b) the contact product of bis(cyclopentadienyl) zirconium dichloride and a trialkylaluminum compound selected from trimethylaluminum, triethyaluminum, triisobutylaluminum and tri-n-octylaluminum in a solution of at least one of a hydrocarbon solvent and said trialkylaluminum compound, wherein component (b) is effectively supported on component (a), and wherein the cocatalyst comprises an alumoxane.

14. The catalyst composition of claim 13, wherein the cocatalyst comprises MMAO.

15. The catalyst composition of claim 14, wherein the cocatalyst further comprises at least one of a trialkylaluminum compound and water.

16. The catalyst composition of claim 1, wherein said support comprises an oxide of at least one of silicon and aluminum.

17. The catalyst composition of claim 13, wherein said support comprises an oxide of at least one of silicon and aluminum.

* * * * *